United States Patent
Mahler et al.

(10) Patent No.: US 7,811,073 B2
(45) Date of Patent: Oct. 12, 2010

(54) BLOW HEAD FOR PRODUCING BLOWN TUBULAR FILM

(75) Inventors: Franz Mahler, Augsburg (DE); Christian Baier, Neusas (DE); Michael Heinecker, Augsburg (DE); Joachim Libowski, Gersthofen (DE)

(73) Assignee: Hosokawa Alpine Aktiengesellschaft, Augsburg (DE)

( * ) Notice: Subject to any disclaimer, the term of this patent is extended or adjusted under 35 U.S.C. 154(b) by 0 days.

(21) Appl. No.: 11/673,945

(22) Filed: Feb. 12, 2007

(65) Prior Publication Data

US 2007/0172536 A1 Jul. 26, 2007

Related U.S. Application Data

(63) Continuation of application No. PCT/EP2005/008914, filed on Aug. 17, 2005.

(30) Foreign Application Priority Data

Aug. 19, 2004 (DE) .................. 10 2004 040 151

(51) Int. Cl.
*B29C 47/06* (2006.01)
(52) U.S. Cl. ............ 425/133.1; 425/191; 425/380; 425/381.2; 425/382.4; 425/462
(58) Field of Classification Search ......... 425/461–463, 425/464–465, 382.4, 131.1, 133.1, 114, 190, 425/191, 326, 377, 467, 505, 507, 508, 516, 425/204, 326.1, 72.1–72.2, 131.5, 2, 72, 425/89, 549, 568, 570, 132, 133.5, 192 R, 425/380, 381, 381.2; 242/11, 615; 34/629, 34/636, 638, 639, 643; 264/209.1, 209.8
See application file for complete search history.

(56) References Cited

U.S. PATENT DOCUMENTS

| 3,642,397 | A | * | 2/1972 | Schippers et al. | 425/516 |
| 3,647,339 | A | * | 3/1972 | Upmeier | 425/326.1 |
| 3,649,143 | A | * | 3/1972 | Papesh et al. | 425/133.1 |
| 3,856,448 | A | * | 12/1974 | Iijima et al. | 425/133.1 |
| 3,930,768 | A | | 1/1976 | Zimmermann et al. | 425/72 |
| 3,966,377 | A | * | 6/1976 | Upmeier et al. | 425/72.1 |
| 4,165,356 | A | * | 8/1979 | Heider | 264/519 |

(Continued)

FOREIGN PATENT DOCUMENTS

DE 23 06 834 C2 7/1982

(Continued)

*Primary Examiner*—Eric Hug
*Assistant Examiner*—Seyed Masoud Malekzadeh
(74) *Attorney, Agent, or Firm*—Winston & Strawn LLP

(57) ABSTRACT

The invention relates to a blow head for producing blown tubular films from thermoplastic materials. Films produced by conventional blow heads often have dull strips or wavy areas, the so-called spiral strips. The aim of the invention is to avoid these negative film properties. For this purpose, the blow head comprises a plurality of annular gap-shaped melt channels arranged concentrically around the center axis of the blow head, the spiral distributor of the inner melt channel being arranged on the inner limiting wall in relation to the center axis of the blow head and the spiral distributor of the outer melt channel being arranged on the outer limiting wall in relation to the center axis of the blow head.

3 Claims, 1 Drawing Sheet

U.S. PATENT DOCUMENTS

| | | | | |
|---|---|---|---|---|
| 4,167,383 A | * | 9/1979 | Murakami et al. | 425/462 |
| 4,182,603 A | * | 1/1980 | Knittel | 425/133.1 |
| 4,185,954 A | * | 1/1980 | Murakami et al. | 425/462 |
| 4,201,532 A | * | 5/1980 | Cole | 425/380 |
| 4,298,325 A | * | 11/1981 | Cole | 425/192 R |
| 4,465,449 A | * | 8/1984 | Hornbeck | 425/131.1 |
| 4,488,861 A | * | 12/1984 | Reifenhauser | 425/379.1 |
| 4,864,064 A | | 9/1989 | Gagel | 568/558 |
| 4,889,477 A | * | 12/1989 | Wortberg et al. | 425/133.1 |
| 5,069,612 A | * | 12/1991 | Teutsch et al. | 425/133.1 |
| 5,076,776 A | * | 12/1991 | Yamada et al. | 425/133.1 |
| 5,256,049 A | * | 10/1993 | Langos et al. | 425/131.1 |
| 5,256,051 A | * | 10/1993 | Langos et al. | 425/133.1 |
| 5,261,805 A | * | 11/1993 | Gates | 425/72.1 |
| 5,262,109 A | * | 11/1993 | Cook | 264/171.29 |
| 5,393,216 A | * | 2/1995 | Teutsch et al. | 425/133.1 |
| 5,460,504 A | * | 10/1995 | Langos et al. | 425/131.1 |
| 5,538,411 A | * | 7/1996 | Gates | 425/133.1 |
| 5,690,972 A | * | 11/1997 | Planeta et al. | 425/133.1 |
| 5,738,881 A | * | 4/1998 | Sagar | 425/133.1 |
| 6,190,152 B1 | * | 2/2001 | Cree | 425/133.1 |
| 6,533,570 B2 | * | 3/2003 | Meyer | 425/380 |
| 6,565,347 B1 | | 5/2003 | Linkies et al. | 425/190 |
| 6,702,563 B2 | * | 3/2004 | Sensen et al. | 425/133.1 |
| 7,097,441 B2 | * | 8/2006 | Sagar et al. | 425/133.1 |
| 2004/0166192 A1 | * | 8/2004 | Stommel | 425/382.4 |

FOREIGN PATENT DOCUMENTS

| | | | |
|---|---|---|---|
| DE | 36 33 308 A1 | | 3/1988 |
| DE | 23 20 687 C2 | | 5/1989 |
| DE | 19521026 | | 12/1995 |
| DE | 19924540 C1 | | 11/2000 |
| DE | 203 07 412 U1 | | 10/2003 |
| EP | 1 055 504 B1 | | 2/2003 |
| EP | 1 211 047 B1 | | 3/2006 |
| JP | 56-67223 | * | 6/1981 |
| JP | 56067223 | | 6/1981 |
| SU | 1502383 | | 8/1989 |

* cited by examiner

BLOW HEAD FOR PRODUCING BLOWN TUBULAR FILM

CROSS-REFERENCE TO RELATED APPLICATIONS

This application is a continuation of International application PCT/EP2005/008914 filed Aug. 17, 2005, the entire content of which is expressly incorporated herein by reference thereto.

BACKGROUND ART

The invention concerns film die heads for the production of single- or multi-layer film. Similar types of film die heads are already known. Film die heads for the production of single-layer tubular film consist of one central mandrel surrounded concentrically by a jacket. Located between the mandrel and the jacket is an annular slit through which the melt is transported to the ring-shaped die. On its outside circumferential surface, the mandrel has one or more spiral grooves, the spiral distributor. The depth of the grooves decreases from the start of the annular slit towards the ring-shaped die. The melt is conveyed by means of one or more melt feed units to the starting points of the grooves of the spiral distributor so that part of the melt is transported in the spiral grooves within the die head towards the ring-shaped die. As a result of the decreasing groove depth, an increasing amount of melt is conveyed over the flight land which separate the grooves in axial direction (see, e.g., U.S. Pat. Nos. 6,565,347 and 3,930,768 or their German equivalents, DE 199 24 540 C1 and DE 23 06 834).

Film die heads for multi-layer tubular film differ from those for single-layer tubular film in that the central mandrel is surrounded coaxially by several ring elements. The ring elements display spiral distributors on their outside circumferential surfaces. Annular slits form between the individual ring elements. The different annular slits are united upstream of the ring-shaped die. The distributor spirals of the individual ring elements are also connected to one or more melt feed units to ensure that they are supplied with melt (see, e.g., U.S. Pat. No. 3,966,377 or its German equivalent DE 23 20 687 and German patent DE 195 21 026).

Another design example of a film die head for multi-layer tubular film is described in (see, e.g., U.S. Pat. No. 6,702,563 or its European equivalent EP 1 055 504 B1). With this variant, the ring elements are conical in shape and are arranged on top of each other. In each case, two contra-oriented spiral channels whose depth decreases towards the opening are machined into the inside or outside circumferential surface of the conical ring elements.

Another variant of a film die head design is described in (see, e.g., U.S. patent application 2004/0166192 or its German equivalent DE 20307412 U1). Here, the spiral distributors are machined into both the inside delimiting wall and the outside delimiting wall of at least one melt channel. This serves to prevent film contamination caused by specks. The spirals of the inside and the outside delimiting walls of the melt channels can be arranged either in congruent or staggered form.

The function of the spiral distributor is to distribute the melt uniformly in the annular slit. The melt is split up by means of primary distributors into a number of separate streams which all flow into the channels of the spiral distributor. The melt stream that flows in the spirals is continuously divided into a tangential component which follows the path of the spiral and an axial component which flows over the flight land located between two spirals into the gap between two ring elements towards the ring-shaped die. As a result, melt which originates from a superimposition of the axial and tangential melt streams from all distributor channels flows at all points across the circumference of the ring-shaped die. These two components cause the melt streams of neighboring spiral channels to not only make contact along their edges but also to overlap each other over a large area of contact. Because of this, and because no joint lines arise with this system, a high thermal homogeneity can be achieved besides the desired mechanical homogeneity. By the end of the spiral distributor, the radial flow in the channels has turned into an exclusively axial flow towards the ring-shaped die.

To make sure an axial spiral flow sets in, a starting gap must be preset on a level with the starting zone of the spiral distributor. Here, part of the melt flows abruptly from the starting zone of the spiral channel into the annular slit. In the process, the melt flows along the production-dictated starting edge and is thus subjected to exceptional orientation and shearing. This fast-flowing axial melt stream displaces areas of melt of the channel above, which causes a sharply delineated boundary zone to form between the melt streams, so-called port lines. This has a negative effect on the quality of the film bubble. Because polymers have a memory function, an area of the film that was adversely affected by, for example, high stress or temperature can be recognized as a dull streak or wavy area. Thus, improvements in these type devices are needed and desired.

SUMMARY OF THE INVENTION

The present invention now provides a film die head of the type mentioned herein which makes it possible to produce tubular blown film without precisely delineated border zones forming between the axial melt streams, which are visible on the film as cloudy streaks or corrugations. This film die head comprises a melt feed unit for providing a melt of the polymer, and several melt channels in the form of annular slits arranged concentrically in relation to a central axis of the film die head, with spiral distributors located at delimiting walls of the melt channels. One spiral distributor is associated with an inside melt channel and is located in relation to the central axis of the film die head on the inside of the delimiting wall and one spiral distributor is associated with an outside melt channel and is located in relation to the central axis of the film die head on the outside of the delimiting wall. Several primary distributors are included to divide the melt exiting the melt feed unit into a number of separate melt streams which then merge into the spiral distributors. Also, a single ring-shaped die is provided and into which the melt channels merge.

Advantageously, the melt channels each have a delimiting wall with spiral distributors and a smooth cylindrical delimiting surface. Also, the spiral distributors each have at least one spiral groove. Preferably, the spirals of the spiral distributors have a depth that decreases from the melt inlet opening towards the ring-shaped die.

BRIEF DESCRIPTION OF THE DRAWINGS

Other specific features and merits of the invention are outlined using the following description and appended drawing figures, wherein.

DETAILED DESCRIPTION OF THE PREFERRED EMBODIMENTS

Figures 1, 2:
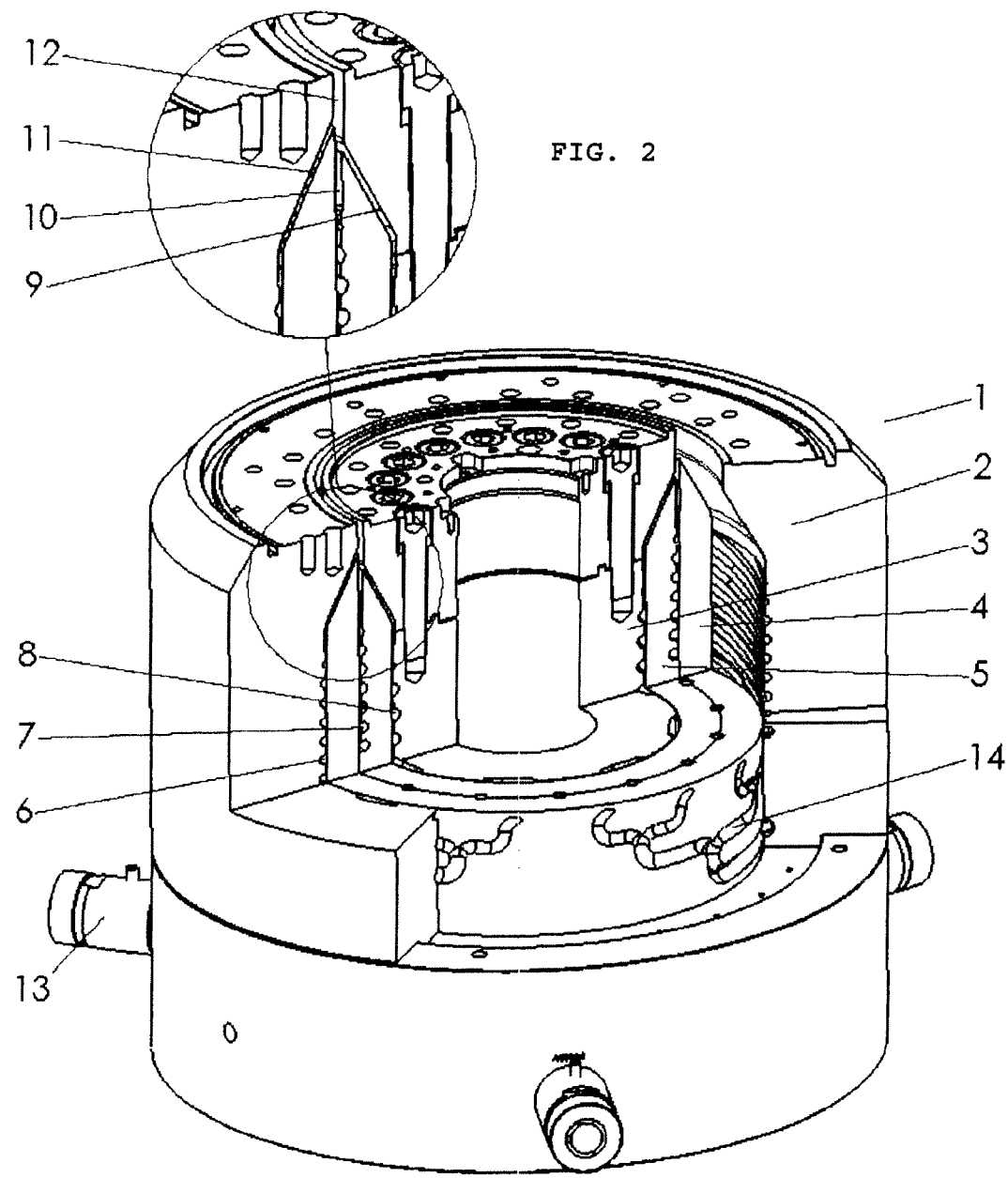
FIG. 1 is a partial cross section of a film die head of the invention.
FIG. 2 is an expanded view of a portion of the film die head of FIG. 1.

It was established that in the case of die heads for multi-layer film whose spiral distributor is located on the outside circumferential surface of the mandrel and ring elements, dull streaks (port lines) or corrugations occur only on the outside layer of the blown film bubble.

In the case of a 3-layer tubular film, for example, the individual layers are formed in the same way. In this connection, the film die head has three concentrically arranged annular slits. Melt flows from the spiral distributor, which lies at the inside delimiting wall of the respective melt channel, into the annular slit. The different melt streams are then brought together in the ring-shaped die. Once the three separate layers have merged, any areas of the inside and centre melt layers that are damaged are completely embedded in the melt. In this condition, the polymer molecules undergo various compensation and relaxation processes. It is only the damaged melt of the outside film layer that remains in contact with the metal surface of the die head housing. Because no homogenization can take place there, the flow history becomes visible on the film once it has exited the die.

The critical combination in a die head is therefore the annual slit between the flight land of the outside ring element and the cylindrical opposite surface of the housing. In order to also incorporate the zones of the outside spiral discharge into the melt merge, this spiral distributor is more or less mirrored. The spiral channels of the spiral distributor are no longer incorporated into the outside circumferential surface of the outside ring element but rather into the inside circumferential surface of the housing. The spiral discharge now takes place towards the inside and ultimately comes into contact with the melt of the other layers. As a result, the damaged melt zones of the inside, centre and outside layers become completely embedded in the melt after the individual layers have merged. This makes it possible to extrude a film that has no cloudy streaks (port lines) and wavy areas.

A spiral discharge without implementing the combination of annular slit and delimiting wall, i.e. by discharging only opposing spiral and semicircular channels by reducing the channel depth, does not bring positive results. The characteristics of an optimally laid out spiral distributor such as extremely good film tolerances and self-cleaning, etc., are still retained by the invention design of the film die head.

FIG. 1 shows the preferred version of an invention-design film die head in partial section. The die head shown here is designed for manufacturing three-layer tubular film. The film die head (1) is composed an inside cylindrical mandrel (3), this is surrounded concentrically by the first ring element (5) which in turn is surrounded by a second ring element (4). This second ring element (4) is surrounded concentrically by a third ring element, in this case the housing (2). In each case, there is an annular slit (9, 10, 11), i.e. the melt channel, located between the mandrel (3) and inside ring element (5), between the inside ring element (5) and the second ring element (4), as well as between the second ring element (4) and the housing (2) which becomes wider and wider as it approaches the ring-shaped die (12). The annular slits (9, 10, 11) join up to form one single passage upstream of the ring-shaped die (12).

The mandrel (3) has a spiral distributor (8) on its outside circumferential surface. The depth of the spirals decreases towards the ring-shaped die (12). The spiral distributor (8) comprises one or more spiral grooves machined into the respective component. The inside ring element (5) also has a spiral distributor (7) on its outside circumferential surface. The second ring element (4) has no spiral distributor. Another spiral distributor (6) is machined into the inside circumferential surface of the housing (2).

The melt is charged via the melt feed unit (13) into the film die head (1) and is conveyed from there via a number of distributors (14) to the start of the spiral distributors (6, 7, 8). From here, the melt is distributed on the one hand in tangential direction in the spirals across the circumference of the annular slit (9, 10, 11), and on the other hand in axial direction within the annular slit (9, 10, 11) between the spiral distributor and the flat cylindrical delimiting wall of the neighboring ring element. Towards the upper end of the annular slit, the tangential component decreases due to the diminishing depth of the spiral distributor grooves and due to the annular slit becoming wider as it approaches the ring-shaped die as a result, and the axial component increases more and more. Upstream of the ring-shaped die, the individual melt streams merge and exit the film die head as one single film.

Because the spiral discharge of the outside layers of the film bubble, i.e. the inside and outside layer, takes place towards the centre of the film bubble, which subsequently make contact with the melt of the other layers, it is possible to produce film that is free from streaks and corrugations.

If the intention is to produce more than 3 layers with an invention-design film die head for multi-layer tubular film, a corresponding number of additional ring elements are installed between the outside and the inside ring element, whereby the spiral distributor of the inside melt channel is located in relation to the centre axis of the film die head on its inside delimiting wall and the spiral distributor of the outermost melt channel is located in relation to the centre axis of the film die head on its outside delimiting wall. If, on the other hand, the film die head is intended for the production of one-layer tubular film, the film die head consists of a mandrel with spiral distributor on the outside surface, ring element without spiral distributor, and housing with spiral distributor on the inside surface.

Film die heads that are designed for the continuous production of tubular film where the formation of port lines, cloudy streaks or corrugations is to be avoided, are configured such that the outside spiral distributors are directed towards the inside and outside surface of the film bubble being produced. The invention is not restricted to the design example described above and shown in the figure. The film die head can, for example, be equipped with mandrel, one ring element and housing, but also with several ring elements dependent on the desired number of film bubble layers. The spiral distributors of the centre melt channels can be located on either the inside or outside delimiting wall of the related melt channel.

What is claimed is:

1. A multiple melt channel film die head suitable for the continuous production of single or multi-layer tubular film made of thermoplastic polymer, comprising:
    a melt feed unit for providing a melt of the polymer;
    a melt inlet opening;
    at least two melt channels in the form of annular slits arranged concentrically in relation to a central axis of the film die head so as to form an inside melt channel and an outside melt channel, wherein each melt channel has a first delimiting wall with a spiral distributor and a second delimiting wall formed by a cylindrical surface, whereby the first delimiting wall associated with the inside melt channel is located radially inside of the second delimiting wall associated with the inside melt channel and the first delimiting wall associated with the outside melt channel is located radially outside of the second delimiting wall associated with the outside melt channel, and where the first delimiting wall with a spiral distributor of the inside melt channel is essentially mirrored by the first delimiting wall with a spiral distributor of the outside melt channel;

a single ring-shaped die within the die-head into which the at least two melt channels merge, wherein each spiral distributor has a spiral groove having a depth that decreases from the melt inlet opening toward the ring-shaped die and the at least two melt channels become wider from the melt inlet opening toward the ring-shaped die, in order to distribute the melt through the melt channels in both a tangential direction and an axial direction; and at least two primary distributors that divide the melt exiting the melt feed unit into a number of separate melt streams which then merge into the spiral distributors at corresponding melt inlet openings.

2. A multiple melt channel film die head for the continuous production of single or multi-layer tubular thermoplastic polymer film, comprising:

a melt feed unit for providing a melt of the polymer;

a melt inlet opening;

two melt channels in the form of annular slits arranged concentrically in relation to a central axis of the film die head so as to form an inner melt channel and an outer melt channel, each of the at least two melt channels having a first delimiting wall with a spiral distributor and a second delimiting wall formed of a cylindrical surface, whereby the first delimiting wall and spiral distributor associated with the inner melt channel is located, in relation to the central axis of the film die head, to be positioned radially inside of the second delimiting wall associated with the inner melt channel, and whereby the first delimiting wall and spiral distributor associated with the outer melt channel is located, in relation to the central axis of the film die head, to be positioned radially outside of the smooth cylindrical surface associated with the second delimiting wall of the outer melt channel, and where the first delimiting wall with a spiral distributor of the inside melt channel is essentially mirrored by the first delimiting wall with a spiral distributor of the outside melt channel;

a single ring-shaped die within the die-head into which the at least two melt channels merge, wherein each spiral distributor has a spiral groove having a depth that decreases from the melt inlet opening toward the ring-shaped die and the at least two melt channels become wider from the melt inlet opening toward the ring-shaped die, in order to distribute the melt through the melt channels in both a tangential direction and an axial direction; and at least two primary distributors that divides the melt exiting the melt feed unit into a number of separate melt streams which then merge into the spiral distributors at corresponding melt inlet openings.

3. The multiple melt channel film die head of claim 1, including a middle melt channel positioned radially between the inner melt channel and the outer melt channel and including a first delimiting wall with a spiral distributor and a second delimiting wall having a smooth cylindrical surface, whereby the first delimiting wall associated with the middle melt channel is located radially inside of the second delimiting wall associated with the middle melt channel, and where the first delimiting wall with a spiral distributor of the middle melt channel is essentially mirrored by the first delimiting wall with a spiral distributor of the outside melt channel to incorporate the zones of the outside spiral discharge into the melt merge.

* * * * *

UNITED STATES PATENT AND TRADEMARK OFFICE
CERTIFICATE OF CORRECTION

| | |
|---|---|
| PATENT NO. | : 7,811,073 B2 |
| APPLICATION NO. | : 11/673945 |
| DATED | : October 12, 2010 |
| INVENTOR(S) | : Mahler et al. |

It is certified that error appears in the above-identified patent and that said Letters Patent is hereby corrected as shown below:

Title Page:
Item (75), Inventors, correct the spelling of the city of residence of Christian Baier from "Neusas" to
-- Neusäß --.

Signed and Sealed this
Twelfth Day of April, 2011

David J. Kappos
*Director of the United States Patent and Trademark Office*